(12) United States Patent
George

(10) Patent No.: US 7,407,353 B2
(45) Date of Patent: Aug. 5, 2008

(54) CARGO SECURING STRAP CHAFE PROTECTOR

(76) Inventor: Kevin George, 178 Forrest St., Wellford, SC (US) 29385

( * ) Notice: Subject to any disclaimer, the term of this patent is extended or adjusted under 35 U.S.C. 154(b) by 44 days.

(21) Appl. No.: 11/523,280

(22) Filed: Sep. 19, 2006

(65) Prior Publication Data

US 2008/0069657 A1    Mar. 20, 2008

(51) Int. Cl.
     *B60P 7/08*      (2006.01)
(52) U.S. Cl. .......................................... 410/99; 410/41
(58) Field of Classification Search .................. 410/41, 410/97, 99, 85, 155; 206/453, 586; 248/345.1; 24/16 R, 68 CD
See application file for complete search history.

(56) References Cited

U.S. PATENT DOCUMENTS

| | | | |
|---|---|---|---|
| 1,624,531 A | 8/1927 | Cary | |
| D192,385 S | 3/1962 | Anderson | |
| 3,152,693 A | 10/1964 | Anderson | |
| 4,765,479 A | 8/1988 | Roberts | |
| 5,311,996 A | 5/1994 | Duffy et al. | |
| 5,518,348 A * | 5/1996 | Tucker | 410/99 |
| 5,848,865 A | 12/1998 | Beals | |
| D410,381 S | 6/1999 | Johnson, III | |

* cited by examiner

*Primary Examiner*—Stephen Gordon
(74) *Attorney, Agent, or Firm*—McNair Law Firm, P.A.; Seann P. Lahey

(57) ABSTRACT

A molded base having a first base section and a second base section arranged at an obtuse angle so that the base has a preformed bend. The base includes a plurality of guide walls carried by the first and second base sections extending along opposing peripheral edges of each base section to define a strap receiving channel for receiving a securing strap and guiding the molded base along the securing strap during positioning. A strap biasing tab is carried by each of the guide walls extending laterally from the guide walls above the strap receiving channel for engaging a securing strap in the strap receiving channel. The obtuse angle between the first base section and the second base section biases each of the strap biasing tabs against the securing strap when under non-load bearing conditions to hold the molded base at a desired location along the securing strap.

6 Claims, 4 Drawing Sheets

CARGO SECURING STRAP CHAFE PROTECTOR

BACKGROUND OF THE INVENTION

1) Field of the Invention

The present invention relates to a chafe protector for cargo securing straps to shield the straps from wearing engagement against an object, and more particularly, to an easily attachable, adjustable, and removable strap chafe protector that will hold a desired position on a strap until forcibly manipulated to a new position when the strap is under non-load bearing conditions.

2) Description of Related Art

Cargo securing straps are used in a wide variety of application from securing heavy loads on commercial flatbed trucks and railway cars to non-commercial light duty applications such as strapping down an item in a pickup truck. A common material for constructing securing straps is nylon, particularly for use in non-commercial light duty applications as they are light weight and extremely strong. However, nylon straps are subject to fraying and ultimately total structural failure resulting from wearing engagement with items over which the straps pass during use. Thus there is a need to protect the strap from wearing engagement against the items being secured without damage to the item.

The prior art discloses a variety of strap attachments. However, most of these items are designed to protect the corner of an item from being damaged by the strap, or do not address the concerns of providing a strap protector that is quickly and easily attachable, removable, and adjustable along the length of the strap. For example, U.S. Pat. No. 4,765,479 discloses a bendable plastic corner support for use in conjunction with strapping materials. The apparatus includes two openings at distal ends for receiving a strap and tabs which extend from the openings that stick into the strap to hold it in a fixed position on the strap. This protector is specifically designed to operate at right angles in order to distribute the force of the strap over a broader area of the edge of the item over which the strap passes to prevent damage to the corner of the item. Once the corner support is in position on the strap it is not readily moveable along the strap due to the tabs which dig into the strap.

U.S. Pat. No. 5,311,996 also discloses an edge protector designed to distribute the force from a tie-down strap over a broader area to prevent damaging the corner edge of a package. The protector is specifically designed in a planar form with a score line through the middle that allows for bending of the protector specifically to a right angle arrangement for protecting corner edges. The invention discloses a spring clip that extends over the strap in order to hold the edge protector in position on the strap. Repositioning of the strap requires tedious manipulation of the spring clip that does not promote a quick and easy attachment, removal, or adjustment along the strap.

U.S. Pat. No. 3,152,693 discloses a slip guide for binding straps. The guide is preformed of a plastic material with two legs extending at approximately a 90° angle from one another. The guide is attached to the strap in a removable manner using tabs that extend partly over the surface of the strap in an opposing arrangement. The tabs are formed in a planar arrangement with the rest of the guide and must be manipulated by bending them upward and outward in order to first receive the strap, and then folded down and locked in position to secure the strap. Repositioning of the strap requires the manipulation of these tabs and the right angle makes sliding along the strap extremely difficult.

U.S. Pat. No. 5,848,865 discloses a lading tie-down strap protector. The protector is secured to the strap by a plurality of flaps that enclose the strap and through which the strap is threaded. The strap can only be removed by manipulating the flaps which are locked in position. Additionally, in order for the flaps to hold the protector in position on the strap, the strap must be a given thickness or the protector will simply slide down the strap uncontrolled. While this invention is intended to protect the strap, it fails to provide a for quick and simply attachment and adjustment on the strap.

Accordingly, it is an object of the present invention to provide a cargo securing strap chafe protector that shields the straps from wearing engagement against an item over which the strap passes.

It is a further object of the present invention to provide an easily attachable and removable strap chafe protector.

It is a further object of the present invention to provide a strap chafe protector that can be quickly adjusted and repositioned to a desired location along the length of the strap.

It is a further object of the present invention to provide a strap chafe protector that will hold a desired position on a strap until forcibly manipulated to a new position when the strap is under non-load bearing conditions.

SUMMARY OF THE INVENTION

The above objectives are accomplished according to the present invention by providing a cargo securing strap chafe protector comprising a molded base having a first base section and a second base section arranged at an obtuse angle to each other so that the base has a preformed bend. The base includes a plurality of guide walls carried by the first and second base sections extending along opposing peripheral edges of each of the base sections to define a strap receiving channel together with the molded base for receiving a securing strap and guiding the molded base along the securing strap during positioning. Additionally, a strap biasing tab is carried by each of the guide walls extending laterally from the guide walls above the strap receiving channel for engaging a securing strap in the strap receiving channel. In use, the obtuse angle between the first base section and the second base section biases each of the strap biasing tabs against the securing strap when under non-load bearing conditions to hold the molded base at a desired location along the securing strap.

In a preferred embodiment, the base is formed from a semi-rigid plastic allowing for deformation of the base as the securing strap is tightened in position around an object in a load bearing condition.

In a further embodiment, the obtuse angle between the first base section and the second base section is preferably between 135° and 180°.

Further, it is also preferred that the obtuse angle between the first base section and the second base section is disposed generally at a midsection of the molded base.

In a further embodiment, the guide walls are discontinuous between the first base section and the second base section to allow for bending of the molded base at the midsection.

In a preferred embodiment, the strap biasing tabs of opposing guide walls are spaced apart to define a strap insertion opening through which the securing strap can be inserted into the strap receiving channel.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
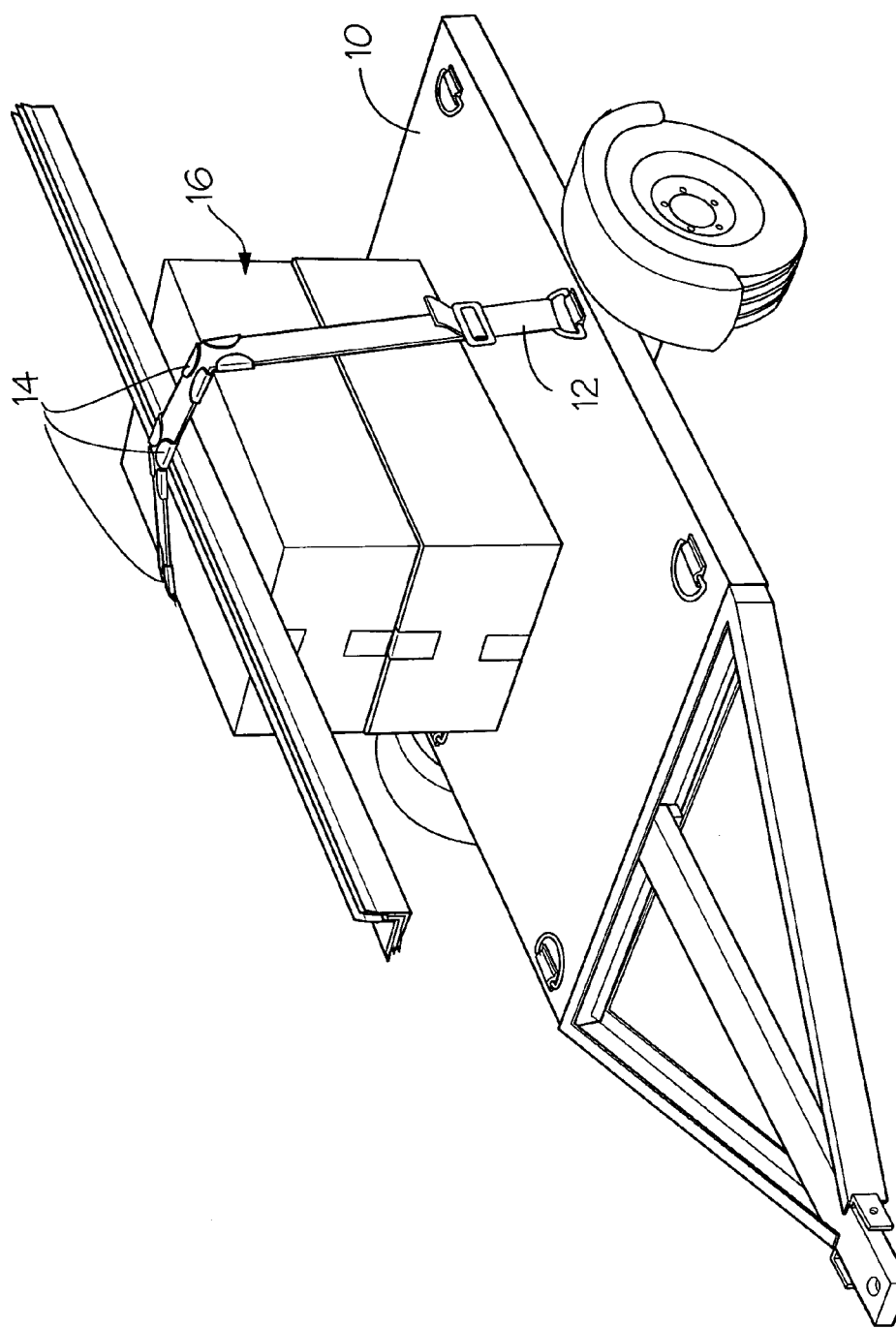
FIG. 1 shows a perspective view of the cargo securing strap chafe protector mounted to a securing strap under a load bearing condition according to the present invention.

With reference to the drawings, the invention will now be described in more detail. Referring to FIG. 1, a small utility trailer 10 is shown carrying a light load of several items, designated generally as 16, with a securing strap 12 holding the items in place on trailer 10. A plurality of cargo securing strap chafe protectors 14 are mounted to strap 12 to protect against wearing engagement between strap 12 and items 16 where strap 12 contacts sharp edges and corners of items 16.

Figure 2:
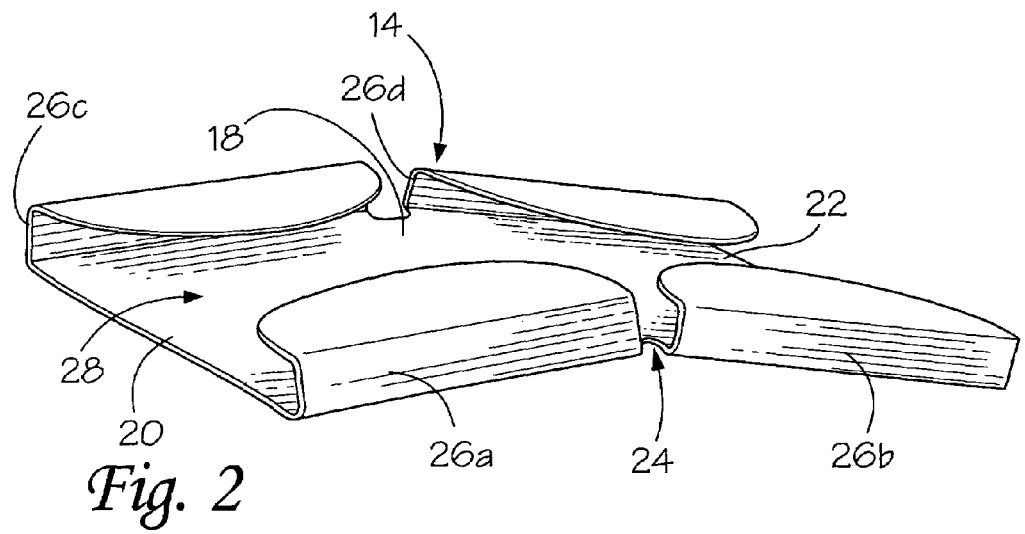
FIG. 2 shows a perspective view of the cargo securing strap chafe protector according to the present invention.

Referring to FIG. 2, strap chafe protector 14 includes a molded base 18. The molded base is divided into a first base section 20 and a second base section 22 about a midsection, designated generally as 24, of molded base 18. Base sections 20 and 22 are arranged at an obtuse angle to each other so that molded base 18 is constructed with a shallow preformed bend. While it is preferred that the bend between first base section 20 and second base section 22 is disposed generally at midsection 24 of molded base 18, it may alternatively be located elsewhere along molded base 18 to accommodate a specific applications.

Preferably, the obtuse angle between first base section 20 and the second base section 22 is between 135° and 180°. Referring to FIG. 3b, in the preferred embodiment, an angle, designed as angle A, is approximately 25° to provide sufficient bend in molded base 18 for biasing strap biasing tabs against a securing strap to hold molded base 18 in position on the strap when under non-load bearing conditions, as detailed herein below Referring to FIGS. 2 and 3a, molded base 18 includes a plurality of guide walls 26a-26d carried by first and second base sections 20 and 22. Guide walls 26a and 26b extend along a first peripheral edge of base sections 20 and 22 to define a first side to molded base 18. Guide walls 26c and 26d extend along an opposing second peripheral edge of base sections 20 and 22 to define a second side to molded base 18. Together, guide walls 26a-26d establish a strap receiving channel, designated generally as 28, in combination with molded base 18 for receiving a securing strap and guiding molded base 18 along the securing strap during positioning.

Additionally, a strap biasing tab 30a-30d is carried by each of guide walls 26a-26d that extends laterally from the guide walls above strap receiving channel 28 for engaging securing strap 12 when placed in strap receiving channel 28.

Figure 4:
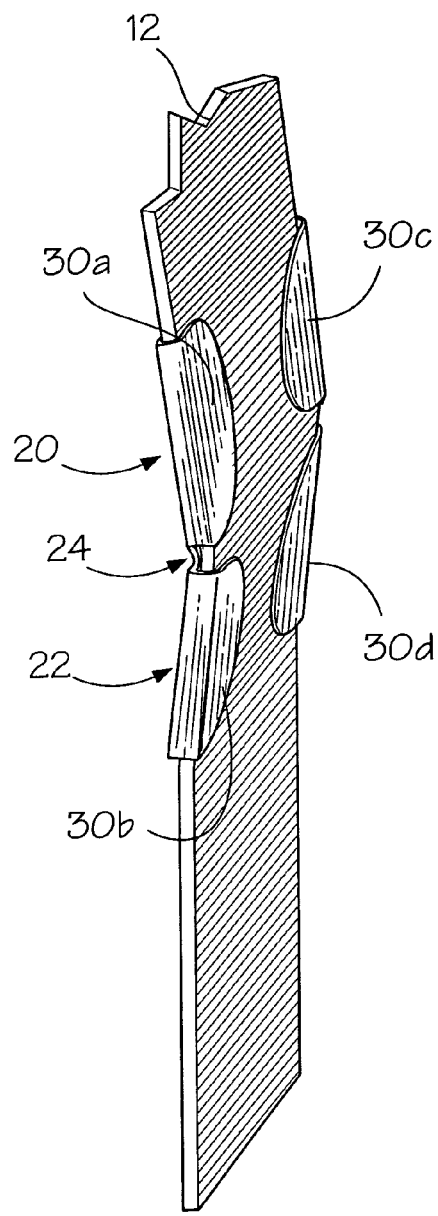
FIG. 4 shows a perspective view of the cargo securing strap chafe protector attached to a securing strap under non-load bearing condition according to the present invention.

Referring to FIG. 4, in use, the obtuse angle between first base section 20 and second base section 22 at midsection 24 biases each of strap biasing tabs 30a-30d against the securing strap. Accordingly, when securing strap 12 is under a non-load bearing condition before being tightened down over the items to be secured, strap biasing tabs 30a-30d hold molded base 18 at a desired location along securing strap 12 so that the user does not have to constantly reposition strap chafe protector 14 as the strap is secured over the item.

Figure 5:
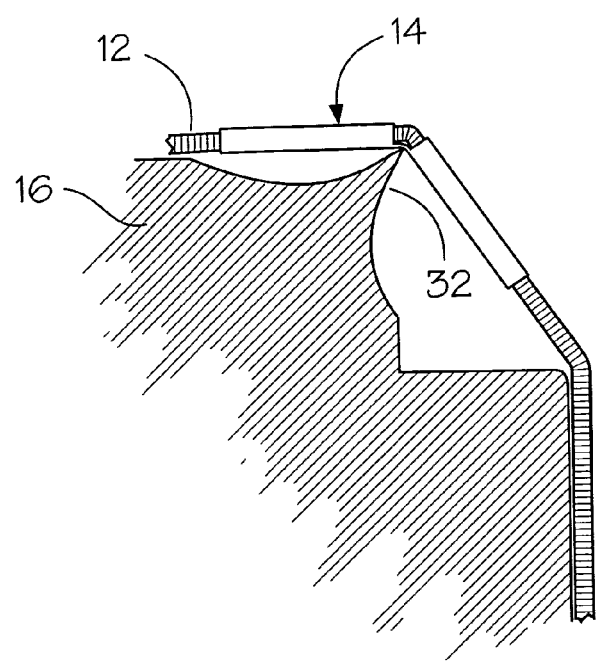
FIG. 5 shows a side view of the cargo securing strap chafe protector mounted to a securing strap under a load bearing condition; and, FIGS. 6a-6c show insertion of a securing strap into the strap chafe protector according to the present invention.

Referring to FIG. 5, in the preferred embodiment, molded base 18 is formed from a semi-rigid plastic. This allows for sufficient resilience to bias strap biasing tabs 30a-30d against securing strap 12 while still allowing for deformation of the base as the securing strap is tightened in position around an object in a load bearing condition. Further, the position of strap chafe protector 14 along the strap can then be easily adjusted by relieving the bias of the strap biasing tabs against the securing strap simply by pushing against strap chafe protector 14 to lessen the bend. In use, this allows the base to generally conform to the contour of the container or item being secured by the strap, and otherwise allows molded base 18 to bend around sharp corners so that the securing strap can properly apply force to hold object in place. As shown in FIG. 5, securing strap 12 passes over item 16, which has a sharp protruding edge 32. As strap 12 is tightened over sharp protruding edge 32, strap chafe protector 14 bends to allow strap 12 to apply force more evenly around edge 32 for better securing item 16. Further, sharp edge 32 is prevented from wearing engagement with strap 12 to prevent damage to both strap 12 and item 16.

Figure 3A:
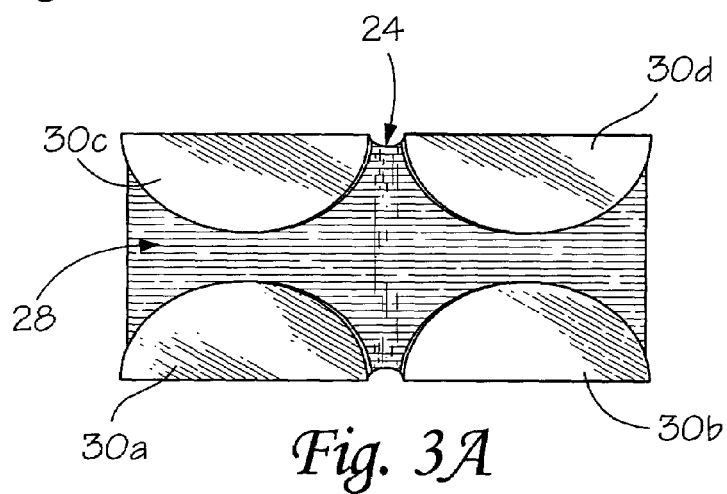
FIG. 3a shows a top plan view of the cargo securing strap chafe protector according to the present invention.
Figure 3B:
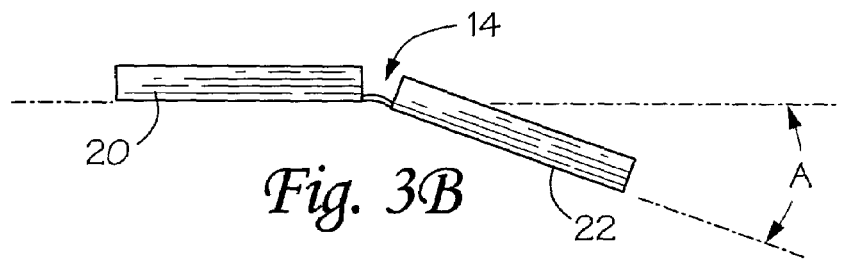
FIG. 3b shows a side elevation view of the cargo securing strap chafe protector having a preformed bend according to the present invention.

Referring to FIGS. 3a and 5, in a preferred embodiment, guide walls 30a-30d are discontinuous between first base section 20 and second base section 22 to allow for bending of the molded base at midsection 24 to accommodate different corner radius and allowing molded base 18 to easily bend over objects when force is applied to securing strap 12.

Figure 6A:
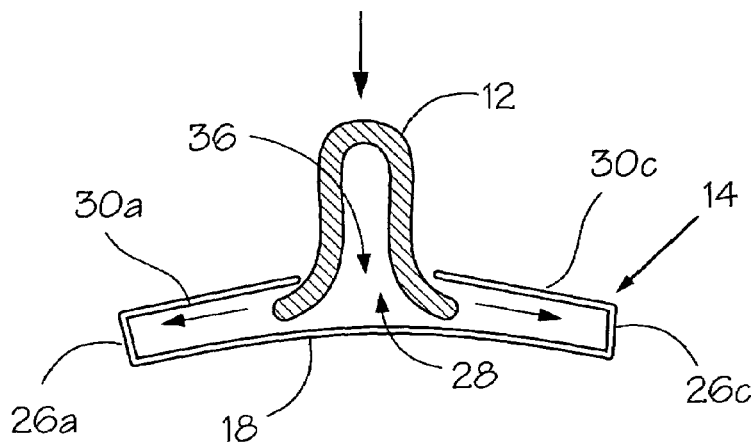
Figure 6B:
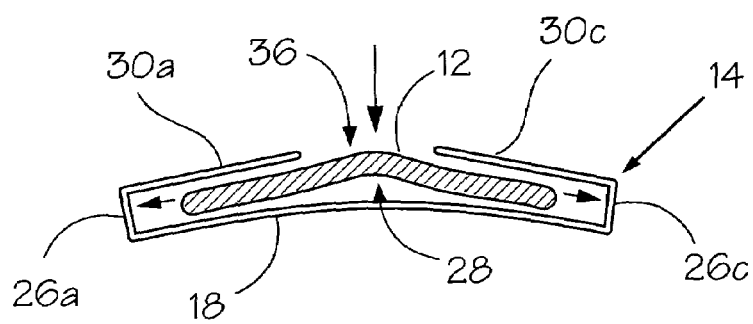
Figure 6C:
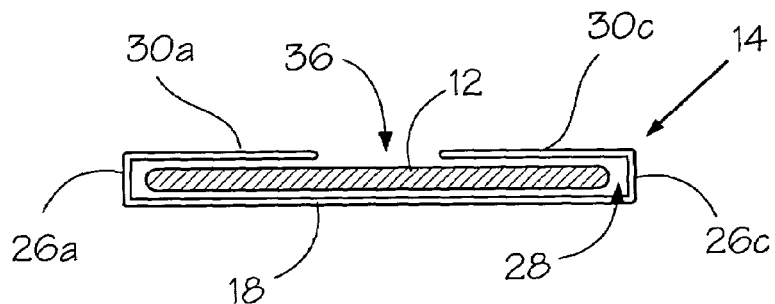

Referring to FIGS. 6a-6c, in a preferred embodiment, strap biasing tabs 30a-30d of opposing guide walls 26a-26d are spaced apart to define a strap insertion opening, designated generally as 36 through which the securing strap can be inserted into the strap receiving channel. By pinching the strap, it is easily inserted into opening 36 and then slides into strap receiving channel 28.

While a preferred embodiment of the invention has been described using specific terms, such description is for illustrative purposes only, and it is to be understood that changes and variations may be made without departing from the spirit or scope of the following claims.

What is claimed is:

1. A cargo securing strap chafe protector comprising:
    a molded base having a first base section and a second base section arranged at an obtuse angle to each other so that said base has a preformed bend;
    a plurality of guide walls carried by said first and second base sections extending along opposing peripheral edges of each said base section to define a strap receiving channel together with said molded base for receiving a securing strap and guiding said molded base along the securing strap during positioning; and,
    a strap biasing tab carried by each of said guide walls extending laterally from said guide walls above said strap receiving channel for engaging the securing strap in said strap receiving channel;
    whereby said obtuse angle between said first base section and said second base section biases each said strap biasing tab against the securing strap when under a non-load bearing condition to hold said molded base at a desired location along the securing strap.

2. The strap chafe protector of claim 1 wherein said base is formed from a semi-rigid plastic allowing for deformation of said base as the securing strap is tightened in position around an object in a load bearing condition.

3. The strap chafe protector of claim 1 wherein said obtuse angle between said first base section and said second base section is between 135° and 180°.

4. The strap chafe protector of claim 1 wherein said obtuse angle between said first base section and said second base section is disposed generally at a midsection of said molded base.

5. The strap chafe protector of claim 4 wherein said guide walls are discontinuous between said first base section and said second base section to allow for bending of said base at said midsection.

6. The strap chafe protector of claim 1 wherein said strap biasing tabs of opposing ones of said guide walls are spaced apart to define a strap insertion opening through which the securing strap can be inserted into said strap receiving channel.

* * * * *